Patented Sept. 25, 1928.

1,685,634

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

PURIFICATION OF BENZOIC ACID AND ITS DERIVATIVES.

No Drawing.      Application filed October 19, 1927. Serial No. 227,358.

This invention relates to processes of separating benzoic acid or its derivatives from phthalic acid or anhydride and its derivatives.

When benzoic acid or its derivatives are prepared from the corresponding anhydrides, or by a single operation from naphthalene, it is frequently contaminated with greater or less amounts of phthalic anhydride or acid depending on the processes used. Similarly, substituted benzoic acids prepared by analogous processes are contaminated by the corresponding substituted phthalic acids, or anhydrides. The separation of these two products presents some difficulty when straight sublimation is used, as phthalic acid is transferred into phthalic anhydride, which is very volatile.

According to the present invention a mixture of benzoic acid and phthalic acid or their derivatives is subjected to a continuous extraction with water and an organic solvent for the benzoic acid. These solvents for the most part have little or no solvent power for phthalic acid and its derivatives. Among the solvents which may be used, particularly with unsubstituted benzoic acid and phthalic acid are benzol, toluol, solvent naphtha, chloroform, carbon tetrachloride, chlorinated hydrocarbons, such as for example, trichlorethylene, tetrachlorethane and some of the chlorinated residues or sludges produced as a by-product from the purification of aromatic hydrocarbons by selective halogenation, and described in my co-pending applications, Serial No. 86,099, filed February 4, 1926, and Serial No. 101,561, filed April 12, 1926, ether, paraffin hydrocarbons, esters and other well known organic solvents of similar character. Most of these solvents are lighter than water, and all of them are substantially immiscible with water.

According to the present invention an aqueous solution of benzoic and phthalic acids, or the corresponding substituted benzoic and phthalic acids, such as the mono- diand tetrachlor substituents, the nitro substituents, homologues, etc., are passed in countercurrent with the organic solvent. The benzoic acids are largely or completely dissolved by the organic solvents and practically no phthalic acids are so dissolved in the case of the unsubstituted products. Where the solvent is lighter than water, as is the case with most of the organic solvents, the aqueous solution of the acids is caused to flow downwardly in contact with an up-flowing stream of organic solvent. Intimate contact can be effected by any suitable means such as vigorous agitation, but in general it is undesirable to use an apparatus completely filled with fine filling bodies, as the capillarity due to the large surface tends to prevent clean separation of the solvent and the remaining water solution of phthalic acid. After separation the benzoic acid is recovered, preferably by distilling off the solvent, and phthalic acid of high purity is also recovered by boiling off the water, or by any other suitable means.

The process can take place at any suitable temperature, such as room temperature, or in some cases even at elevated temperatures. The temperature, however, will depend on the solvent, as the solubilities of benzoic acid and phthalic acid in the various organic solvents are frequently dependent upon the temperature, and in every case the skilled chemist will choose a temperature which will effect the most rapid and complete separation with the particular solvent used. In general, however, I have found that for example with solvents like benzol, in which benzoic acid is readily soluble in the cold, the use of room temperatures or at most moderate warming is very effective, and of course presents advantages in ease and simplicity of operation.

In describing the features of the present invention, the process has been described as carried out with a single organic solvent. It will be clear to the chemist that the combination of one or more solvents may also be used, and is of course included in the scope of the invention, and wherever in the specification and claims an organic solvent is referred to it should be understood that this expression includes also a mixture of organic solvents.

The invention will be described in greater detail in connection with the following examples:

*Example 1.*

An almost saturated aqueous solution of benzoic acid and phthalic acid containing benzoic acid and phthalic acid in the ratio of 85 to 15 is passed downwardly through a vessel in countercurrent to benzol, the benzol which rises through the acid solution and passes out at the top of the apparatus used dissolves most or all of the benzoic acid, but shows little or no solvent action for the phthalic acid, which latter is continuously removed from the bottom of the treating vessel in the form of an aqueous solution which is substantially or largely free from benzoic acid. The benzol may be distilled off, or the benzoic acid may be precipitated therefrom by any suitable means. The benzol may be recovered and reused. The phthalic acid may be recovered by precipitation with reagents, by boiling off the water or by concentrating the solution followed by crystallization, the latter procedure of course resulting in the purest product.

*Example 2.*

A mixture of orthochlorbenzoic acid and the corresponding 3. chlorphthalic acid dissolved in water to form an almost saturated solution is passed downwardly in countercurrent with chloroform, as described in the foregoing example. An excellent separation is effected, and the two products can be recovered from their chloroform and water solutions respectively as described above.

*Example 3.*

A mixture of dichlorbenzoic acid and the corresponding dichlorphthalic acid in aqueous solution is treated as in the foregoing examples using a mixture of benzol and toluol as the solvent, instead of benzol alone. A good separation is obtained, and the products may be recovered as described.

*Example 4.*

A mixture of benzoic and phthalic acids in the form of aqueous dispersion is permitted to flow into a treatment vessel together with a stream of gasoline. The vessel is provided with partly submerged pipe and nozzle below the submerged end forming the well known air lift or mammoth pump. Any suitable gases, such as air, carbon dioxide, nitrogen or the like are introduced through the nozzle forming the usual bubbles and lifting the aqueous solution of benzoic and phthalic acids and gasoline in the form of a foam or bubbling liquid. The air lift pipe is sufficiently long so that intimate mixture of the two liquid components takes place. The outflowing mixture is then continuously separated into a gasoline and a water layer in any suitable well known manner and the phthalic acids may be recovered from the water solution while benzoic acids are likewise recovered from the gasoline solution. The air lift or mammoth pump may be sufficiently long to effect substantially complete separation in a single passage or the mixed gasoline and phthalic benzoic dispersion may be passed through the mammoth pump several times to effect complete separation. This latter procedure necessarily, of course, is to a certain extent discontinuous but in many cases presents some advantages in cheaper equipment and more perfect separation. For large outputs, however, it is usually more desirable to use a sufficiently long air lift pipe to effect separation in a single passage. Instead of gasoline, any of the solvents for benzoic acid may be used singly or in admixture.

This application is a continuation in part of my co-pending application, Serial No. 223,845, filed October 3, 1927.

What is claimed as new is:

1. A method of separating benzoic acids from the corresponding phthalic acids, which comprises subjecting the aqueous dispersion of the acids to continuous leaching with a current of organic solvents for benzoic acid, separating the solvent from the water and removing benzoic acids from the solvent solution and phthalic acids from the water solution.

2. A method of separating benzoic acids from the corresponding phthalic acids, which comprises causing an aqueous dispersion of the two acids to contact in countercurrent with a stream of organic solvent for the benzoic acids and separating the benzoic acids from solution in the solvent and phthalic acids from the resulting water solution.

3. A method of separating benzoic acids from the corresponding phthalic acids, which comprises causing an aqueous dispersion of the two acids to mix with a stream of an organic solvent in the lift pipe of a gas lift or mammoth pump, the lift being effected by a gas which does not substantially attack benzoic or phthalic acids, separating the effluent mixture into a water and organic solvent solutions and separating the benzoic acids from the organic solvent and the phthalic acids from the water solution.

4. A method according to claim 3 in which the lift pipe in the mammoth pump is so dimensioned with regard to the operating speed that a substantially complete solution of the benzoic acids in the organic solvent is effected by a single passage therethru and the effluent mixture is continuously separated into solvent and water streams.

Signed at Pittsburgh, Pennsylvania, this 18th day of October, 1927.

ALPHONS O. JAEGER.